US008835034B2

(12) United States Patent
Yoon (10) Patent No.: US 8,835,034 B2
(45) Date of Patent: Sep. 16, 2014

(54) RECHARGEABLE BATTERY AND BATTERY MODULE

(75) Inventor: Ji-Hyoung Yoon, Suwon-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 494 days.

(21) Appl. No.: 12/575,383

(22) Filed: Oct. 7, 2009

(65) Prior Publication Data

US 2010/0119928 A1 May 13, 2010

(30) Foreign Application Priority Data

Oct. 8, 2008 (KR) .................... 10-2008-0098767

(51) Int. Cl.
*H01M 2/10* (2006.01)
*H01M 10/613* (2014.01)
*H01M 10/6551* (2014.01)
*H01M 10/6557* (2014.01)
*H01M 10/653* (2014.01)
*H01M 10/643* (2014.01)
*H01M 10/6562* (2014.01)
*H01M 10/6567* (2014.01)
*H01M 10/623* (2014.01)

(52) U.S. Cl.
CPC *H01M 2/10* (2013.01); *Y02E 60/12* (2013.01); *H01M 10/5004* (2013.01); *H01M 10/5075* (2013.01); *H01M 10/5046* (2013.01); *H01M 10/5059* (2013.01); *H01M 10/504* (2013.01); *H01M 10/503* (2013.01); *H01M 10/5012* (2013.01); *H01M 10/5065* (2013.01)
USPC ............... 429/120; 429/97; 429/148

(58) Field of Classification Search
CPC ...................... H01M 10/5046; H01M 10/5059
USPC ........... 429/96–100, 148–160, 163–187, 120
See application file for complete search history.

(56) References Cited

U.S. PATENT DOCUMENTS 2,385,127 A * 9/1945 Carlile .......................... 429/163
4,158,802 A 6/1979 Rose, II
(Continued)

FOREIGN PATENT DOCUMENTS

CN 1855597 11/2006
EP 1 309 019 A2 5/2003
(Continued)

OTHER PUBLICATIONS

Machine translation of JP 2003-109675 A (Toya).*
(Continued)

*Primary Examiner* — Raymond Alejandro
*Assistant Examiner* — Helen McDermott
(74) *Attorney, Agent, or Firm* — Knobbe Martens Olson & Bear LLP (57) ABSTRACT

A rechargeable battery according to the present invention includes an electrode assembly repeating charge and discharge with the movement of ions, a case containing the electrode assembly, and a supporting member surrounding the case and having a plurality of ribs on the outer surface thereof. Further, a battery module according to the present invention includes a plurality of rechargeable batteries, and a frame into which the rechargeable batteries are inserted. The rechargeable batteries include a case and a supporting member in contact with the case, and the supporting member includes a body surrounding the rechargeable battery and a rib protruding outwardly from the body.

18 Claims, 11 Drawing Sheets

(56) References Cited

U.S. PATENT DOCUMENTS

| | | | |
|---|---|---|---|
| 4,470,652 | A | 9/1984 | Schwab |
| 4,724,189 | A | 2/1988 | Chase |
| 4,736,921 | A | 4/1988 | Zane et al. |
| 5,677,079 | A | 10/1997 | DeZorzi |
| 5,733,674 | A | 3/1998 | Law |
| 5,900,332 | A | 5/1999 | Marukawa et al. |
| 2003/0186114 | A1* | 10/2003 | Lohr et al. ............... 429/96 |
| 2004/0058233 | A1* | 3/2004 | Hamada et al. ............ 429/159 |
| 2005/0070164 | A1 | 3/2005 | Mita et al. |
| 2006/0073378 | A1* | 4/2006 | Hamery et al. ............ 429/120 |
| 2006/0078789 | A1 | 4/2006 | Wegner |
| 2006/0220615 | A1* | 10/2006 | Kim ............... 320/116 |
| 2006/0270277 | A1 | 11/2006 | Zhao et al. |
| 2007/0009787 | A1* | 1/2007 | Straubel et al. ............ 429/99 |
| 2007/0141452 | A1* | 6/2007 | Kim ............... 429/120 |
| 2008/0121380 | A1* | 5/2008 | Shimoyama ............ 165/121 |
| 2008/0182162 | A1 | 7/2008 | Kim |
| 2009/0072785 | A1 | 3/2009 | Moon |
| 2009/0123819 | A1 | 5/2009 | Kim |
| 2009/0123820 | A1 | 5/2009 | Han |
| 2009/0202897 | A1 | 8/2009 | Kim et al. |
| 2010/0178548 | A1 | 7/2010 | Baek |
| 2011/0076540 | A1* | 3/2011 | Ronning et al. ............ 429/120 |
| 2011/0091760 | A1 | 4/2011 | Straubel et al. |

FOREIGN PATENT DOCUMENTS

| | | |
|---|---|---|
| EP | 1498964 | 1/2005 |
| EP | 1 746 679 A1 | 1/2007 |
| EP | 1 705 743 B1 | 9/2007 |
| GB | 2294578 | 5/1996 |
| JP | 08-293300 | 11/1996 |
| JP | 09-190811 | 7/1997 |
| JP | 10-003950 | 1/1998 |
| JP | 10-106533 | 4/1998 |
| JP | 10-270095 | 10/1998 |
| JP | 11-054157 | 2/1999 |
| JP | 11144766 A2 | 5/1999 |
| JP | 2000-106170 | 4/2000 |
| JP | 2001-126703 | 5/2001 |
| JP | 2001-155789 | 6/2001 |
| JP | 2001-307695 | 11/2001 |
| JP | 2001-345088 | 12/2001 |
| JP | 2001-345089 | 12/2001 |
| JP | 2002-184385 | 6/2002 |
| JP | 2002-298822 | 10/2002 |
| JP | 2002-352793 | 12/2002 |
| JP | 2002359014 A2 | 12/2002 |
| JP | 2003-109558 | 4/2003 |
| JP | 2003-109675 | 4/2003 |
| JP | 2003109675 A * | 4/2003 |
| JP | 2003-297438 | 10/2003 |
| JP | 2004-087218 | 3/2004 |
| JP | 2004-227954 | 8/2004 |
| JP | 2004-286172 | 10/2004 |
| JP | 2005-026219 | 1/2005 |
| JP | 2005-349955 | 12/2005 |
| JP | 2006-127921 | 5/2006 |
| JP | 2006-139987 | 6/2006 |
| JP | 2006-179190 | 7/2006 |
| JP | 2006-278334 | 10/2006 |
| JP | 2008-192379 | 8/2008 |
| JP | 2008-541386 | 11/2008 |
| KR | 10-20010036651 | 5/2001 |
| KR | 1020060028057 | 3/2006 |
| KR | 1020060045008 | 5/2006 |
| KR | 10 20060086122 | 7/2006 |
| KR | 10-2006-0104070 | 10/2006 |
| KR | 1020070006956 | 1/2007 |
| KR | 1020070014658 | 2/2007 |
| KR | 10-20070089615 | 8/2007 |
| WO | WO 2007/001345 | 1/2007 |
| WO | WO 2008/093181 | 8/2008 |

OTHER PUBLICATIONS

Search Report dated Nov. 18, 2010 for corresponding EP Application 09172576.2.
Extended Search Report dated Aug. 12, 2010 for corresponding application No. EP 08150025.8-2119 /1953849.
U.S. Appl. No. 12/177,789, filed Jul. 22, 2008, Dae-Won Han, Final Office Action of Jul. 9, 2010 Office Action of Feb. 3, 2010 and response Restriction Requirement of Nov. 16, 2009 and response.
EP Search Report for related EP Application No. 08168712.1-1227, Feb. 4, 2009.
U.S. Appl. No. 12/177,789, filed Jul. 22, 2008, Dae-Won Han, Office Action of Feb. 3, 2010 and response Restriction Requirement of Nov. 16, 2009 and response.
Office Action dated Dec. 16, 2011 for corresponding CN application No. 200910151287.
Office Action dated Jun. 12, 2012 for corresponding JP Application No. 2009-234170.
Office Action dated Nov. 2, 2012 for corresponding CN Application No. 200910151287.7.
Office Action dated Oct. 30, 2012 for corresponding JP Application No. 2009-234170.
Office Action dated Mar. 26, 2013 for corresponding JP Application No. 2009-234170.
Office Action dated May 2, 2013 for corresponding CN Application No. 200910151287.7.
Certificate of Invention Patent dated Jan. 15, 2014 for corresponding CN Application No. 101714645.

* cited by examiner

RECHARGEABLE BATTERY AND BATTERY MODULE

CROSS-REFERENCE TO RELATED APPLICATION

This application claims priority to and the benefit of Korean Patent Application No. 10-2008-0098767 filed in the Korean Intellectual Property Office on Oct. 8, 2008, the entire content of which is incorporated herein by reference.

BACKGROUND OF THE INVENTION

1. Field of the Invention

The present invention relates to a rechargeable battery and a battery module. More particularly, the present invention relates to a rechargeable battery and a battery module including a supporting member that surrounds a case of the rechargeable battery and provides a coolant flow path.

2. Description of the Related Art

A rechargeable battery can be repeatedly recharged and discharged, unlike a primary battery that cannot be recharged. A low capacity rechargeable battery including one cell is used for a small and portable electronic device such as a mobile phone, a laptop computer, and a camcorder. A large capacity rechargeable battery including a plurality of cells connected in a shape of a pack is used as a power source for driving a motor of a hybrid vehicle.

Rechargeable batteries are produced in various shapes, and typically in a shape of a cylinder or polygon.

Further, a rechargeable battery is serially connected and includes a high capacity rechargeable battery module such that it can be used for driving a motor of an electric vehicle that needs a large amount of electric power.

A battery module generally includes a plurality of serially connected rechargeable batteries (hereinafter, "rechargeable battery" for convenience of explanation throughout the specification).

Each rechargeable battery includes an electrode array having a positive electrode, a separator, and a negative electrode sequentially, a case containing the electrode array, and a cap assembly for closing an open end of the case and electrically connected to the electrode assembly.

In addition, rechargeable batteries are generally arranged apart from each other within a frame and form a battery module by connecting terminals of each rechargeable battery.

Here, a battery module has a single module structure incorporating a plurality of rechargeable batteries for securing stability.

However, as a single battery module is configured to connect several to several tens of rechargeable batteries, it should be capable of easily exhausting heat generated by each rechargeable battery. A heat dissipation characteristic of a battery module is extremely significant because both the rechargeable battery's performance and the device equipped with a battery module depend on it.

Without sufficient heat dissipation, a temperature difference arises among rechargeable batteries and the battery module fails to generate sufficient electric power for operating a motor. In addition, if the internal temperature of a rechargeable battery rises due to the heat generated by the battery, the battery's charge/discharge performance is deteriorated by an abnormal reaction inside the battery.

Particularly, if the above-described battery module is used as a large capacity rechargeable battery for a device, the rechargeable battery is charged or discharged with a large amount of electric current. Further, depending on the patterns of usage, internal temperature of the rechargeable battery may rise to a significant level and the heat generated by the rechargeable battery needs to be exhausted properly.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a battery module capable of effectively cooling rechargeable batteries.

A rechargeable battery according to an exemplary embodiment of the present invention includes an electrode assembly repeating charge and discharge with the movement of ions, a case containing the electrode assembly, and a supporting member surrounding the case and having a plurality of ribs on the outer surface thereof.

A heat-conductive adhesive layer may be formed between the case and the supporting member, and the supporting member may include a body in contact with the case and a rib extending along the length of the body The body may have a shape of a pipe, and the height of the rib changes along the length thereof.

The rib may include a supporting rib and a fixing rib that is higher than the supporting rib, and a slit may extend along the length of the body. Further, an anodized film may be formed on the surface of the supporting member.

A battery module may include a plurality of rechargeable batteries and a frame into which the rechargeable batteries are inserted, wherein the rechargeable batteries include a case and a supporting member in contact with the case, and wherein the supporting member includes a body surrounding the rechargeable battery and a rib protruding from the body.

The body may have a shape of a pipe and a heat-conductive adhesive layer may be between the case and the body.

The rib may include a supporting rib and a fixing rib that is higher than the supporting rib, and a fixing protrusion may be formed at the fixing rib.

A fixing groove may be formed at the frame and the fixing protrusion may be inserted into the fixing groove.

A slit may extend along the length of the body, and an anodized film may be formed on the surface of the supporting member. In addition, the height of the rib may change between a coolant inflow end and an outflow end. In addition, the height of the rib may increase from the coolant inflow end to the outflow end. A hole may be arranged in the frame and the cross-sectional area of the hole may vary from the coolant inflow end to the outflow end. Further, the cross-sectional area of the hole may decrease from the coolant inflow end to the outflow end. Spaces between the ribs may communicate with each other within the hole.

As described above, according to the present invention, rechargeable batteries can be stably cooled by creating a flow path for a coolant using a supporting member.

In addition, since the supporting member and the case of the rechargeable battery are coupled with a heat-conductive adhesive, heat transfers quickly from the case to the supporting member, effectively cooling the rechargeable batteries.

In addition, with an anodized film on the surface of the supporting member, short circuits in the rechargeable batteries can be prevented.

DETAILED DESCRIPTION OF THE EMBODIMENTS

Hereinafter, the present invention will be described more fully with reference to the accompanying drawings, in which exemplary embodiments of the invention are shown. As those skilled in the art would realize, the described embodiments may be modified in various different ways, all without departing from the spirit or scope of the present invention.

Figure 1:
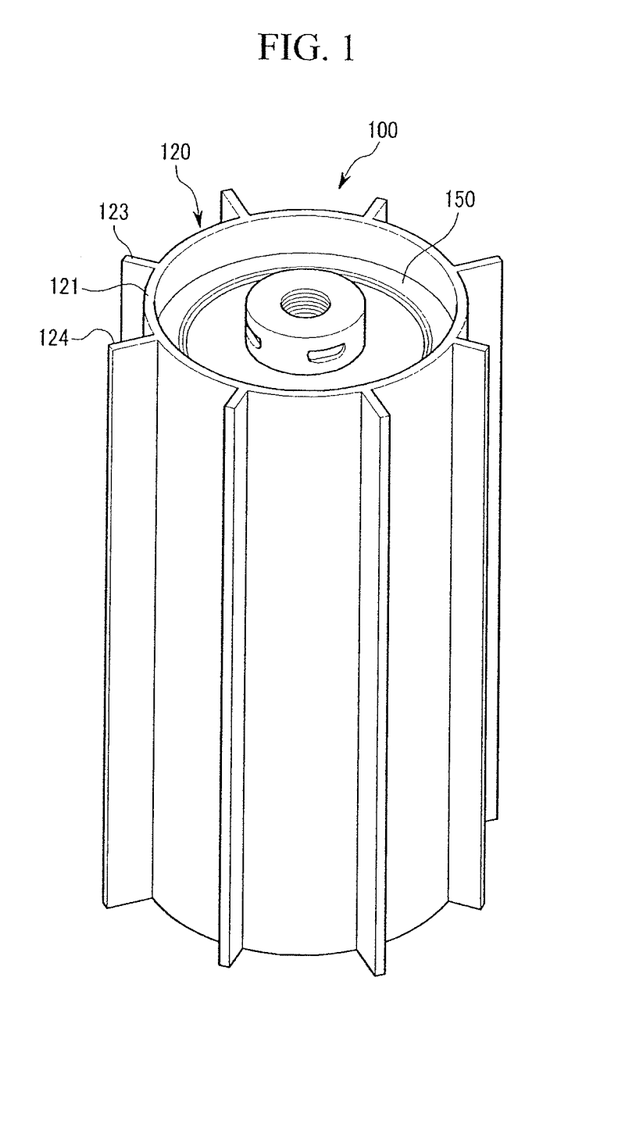
FIG. 1 is a perspective view of a rechargeable battery according to a first exemplary embodiment of the present invention.
Figure 2:
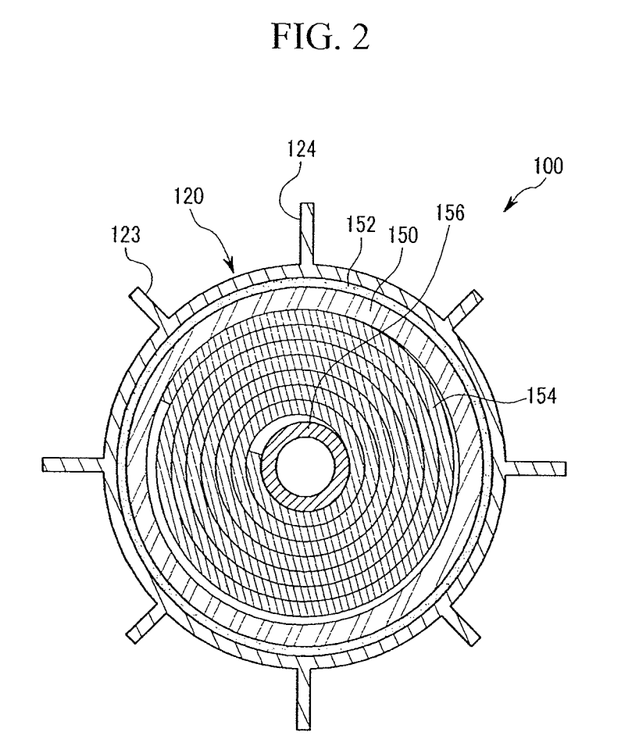
FIG. 2 is a horizontal cross-sectional view of the rechargeable battery according to the first exemplary embodiment of the present invention.

FIG. 1 is a perspective view of a rechargeable battery according to a first exemplary embodiment of the present invention, and FIG. 2 is a horizontal cross-sectional view of the rechargeable battery according to the first exemplary embodiment of the present invention.

Referring to FIG. 1 and FIG. 2, a rechargeable battery 100 according to the present exemplary embodiment includes an electrode assembly 154 for charge and discharge, a case 150 containing the electrode assembly 154, and a supporting member 120 surrounding the case 150.

The electrode assembly 154 includes a positive electrode, a negative electrode, and a separator between the positive electrode and the negative electrode that are wound together around a cylindrical core 156 that is positioned on the inside of the wound electrodes and separator.

The case 150 has a cylindrical shape with an internal space for containing the electrode assembly 154, and may be made of aluminum. Even though the case 150 has a cylindrical shape in the present exemplary embodiment, the present invention is not limited to that shape; the case 150 can be cylindrical, polygonal, etc.

The supporting member 120 is arranged outside of the case 150. The supporting member 120 includes a body 121 and a plurality of ribs 123 and 124. The body 121 is in close contact with the case 150 and surrounds the case 150. The ribs 123 and 124 protrude from the outer surface of the body 121 and extend along the length of the rechargeable battery 100.

Even though the body 121 has a shape of a pipe into which the case 150 is inserted in the present exemplary embodiment, the present invention is not limited to that shape; the body 121 may have various shapes as long as it can be in contact with the case 150.

A heat-conductive adhesive layer 152 is arranged between the body 121 and the case 150. The heat-conductive adhesive layer 152 quickly transfers heat generated inside the case 150 to the body 121 and improves heat dissipation efficiency.

The heat that is transferred to the body 121 is exhausted to the outside through the body 121 and the ribs 123 and 124. With this configuration, contact areas between the body 121 and the ribs 123 and 124 and a coolant are enlarged to easily exhaust the heat to the outside.

Figure 3:
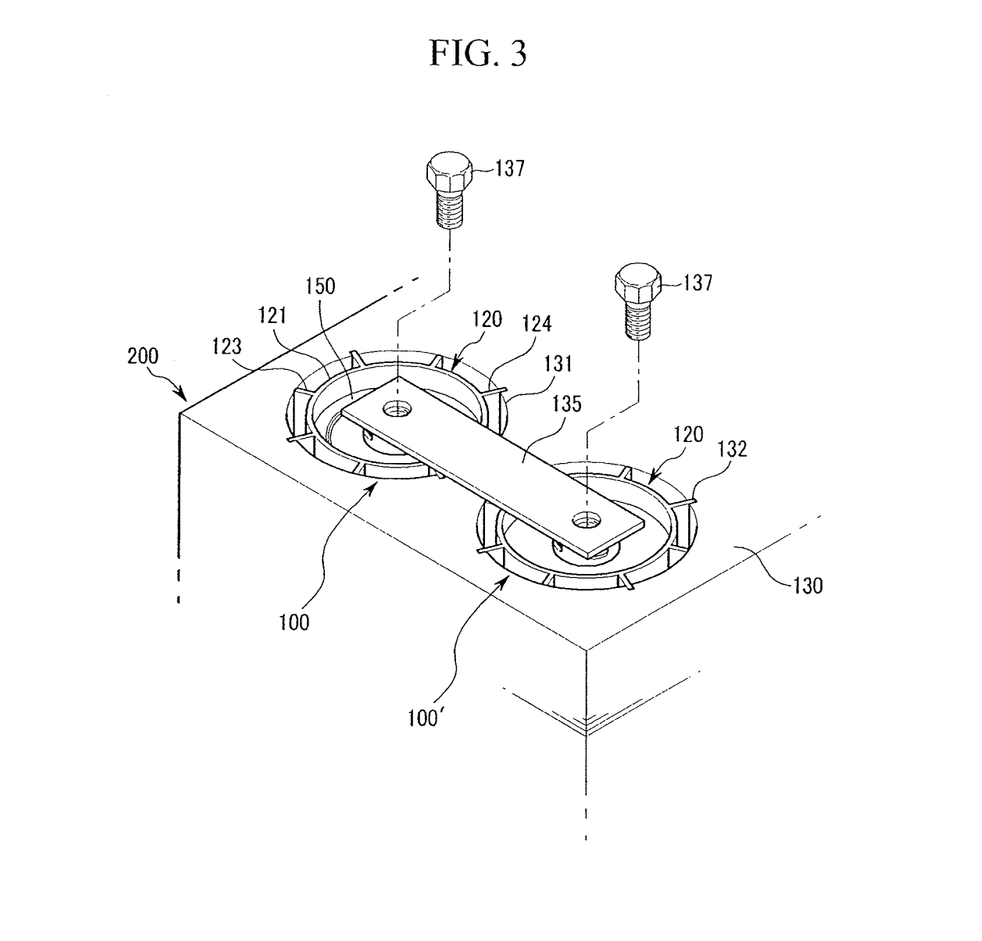
FIG. 3 is a partial perspective view of a battery module according to the first exemplary embodiment of the present invention.

In addition, the ribs 123 and 124 define a supporting rib 123 and a fixing rib 124 that is higher than the supporting rib 123. As shown in FIG. 3, the fixing rib 124 is inserted into the frame 130 and prevents the rechargeable battery 100 from moving.

The supporting member 120 is made of aluminum and an anodized film is formed on the surface of the supporting member 120. The anodized film is formed by oxidizing the surface of the aluminum and sealing it. The anodized film formed on the surface of the supporting member 120 insulates the supporting member 120, and helps prevent a short circuit in the rechargeable battery and stably exhaust heat to the outside.

FIG. 3 is a partial perspective view of a battery module according to the first exemplary embodiment of the present invention.

As shown in FIG. 3, a battery module 200 includes a plurality of rechargeable batteries 100 and 100', and a frame 130 into which the rechargeable batteries 100 and 100' are inserted.

The frame 130 includes a plurality of holes 131 into which the rechargeable batteries 100 and 100' are inserted. The holes 131 have both ends open. When the rechargeable battery 100 is inserted into the hole 131, the supporting rib 123 comes into close contact with the internal surface of the hole 131.

The fixing rib 124 is configured to be inserted into the frame 130. That is, the fixing rib 124 is inserted into a fixing groove 132 in the hole 131 and prevents the rechargeable battery 100 from rotating.

As described above, when the rechargeable battery 100 is fixed within the frame 130, a coolant is provide between the hole 131 and the supporting member 120, stably cooling the rechargeable batteries 100 and 100'. In this case, the coolant may be air, water, etc.

Positive and negative terminals of adjacent rechargeable batteries 100 and 100' are arranged in an alternating manner and are electrically connected via a bus bar 135. In the present exemplary embodiment, the case 150 is a negative terminal and a cap plate on the upper side is a positive terminal. A rechargeable battery 100 is arranged such that its cap plate is up on the upper side, and the adjacent rechargeable battery 100' is arranged such that that the bottom of its case is placed up on the upper side.

With this arrangement, the bus bar 135 is fixed to the rechargeable batteries 100 and 100' with a bolt 137 such that the rechargeable batteries 100 and 100' are electrically connected.

As described above, according to the present exemplary embodiment, the rechargeable batteries 100 and 100' can be stably placed within the frame 130 via the supporting member 120. Further, the ribs 123 and 124 and the body 121 increases the surface area and improves the heat dissipation efficiency.

In addition, the ribs 123 and 124 of the supporting member 120 function as a buffer against external impact, and inhibit the rechargeable battery 100 from being damaged by the external impact.

Figure 4:
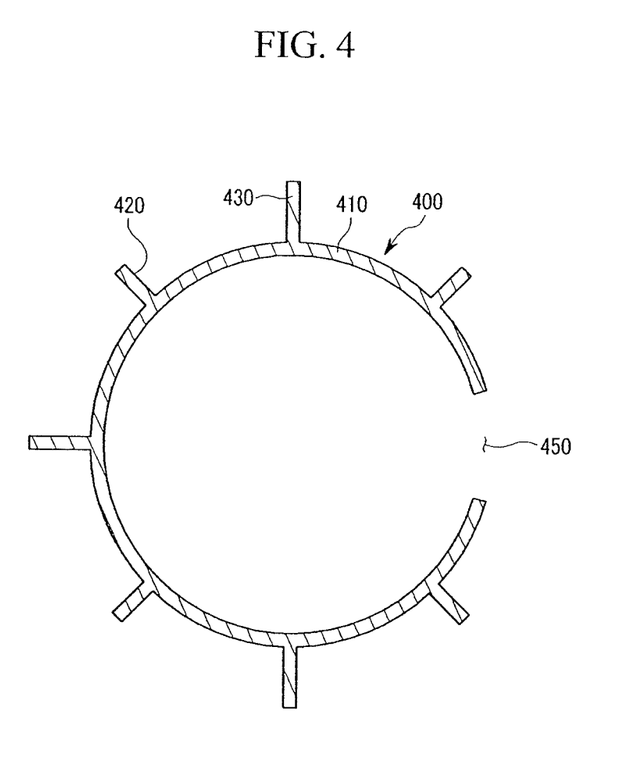
FIG. 4 is a cross-sectional view of a supporting member according to a second exemplary embodiment of the present invention.

FIG. 4 is a cross-sectional view of a supporting member according to a second exemplary embodiment of the present invention. Referring to FIG. 4, a supporting member 400 includes a body 410 in close contact with a case, and ribs 420 and 430 protruding from the body 410. The body 410 has a substantial shape of a "C" with a slit 450 formed at a portion thereof. Further, the ribs 420 and 430 include a supporting rib 420 and a fixing rib 430 that is higher than the supporting rib 420.

Since the slit 450 is formed at the body 410, the body 410 may be deformed and come into close contact with the case while the supporting member 400 is coupled to the case. Accordingly, the supporting member 400 can be applied to cases of various sizes.

Figure 5:
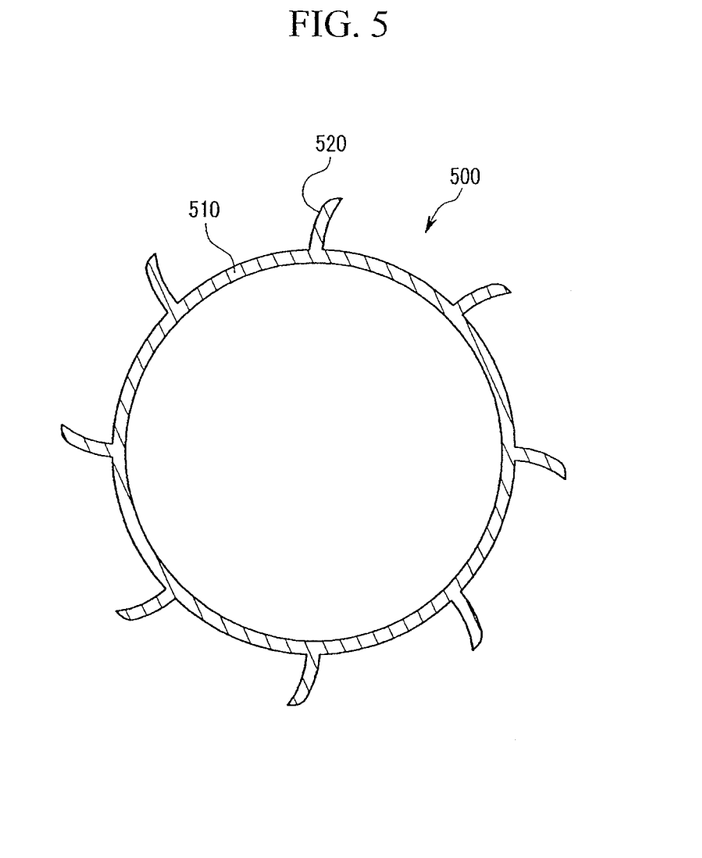
FIG. 5 is a cross-sectional view of a supporting member according to a third exemplary embodiment of the present invention.

FIG. 5 is a cross-sectional view of a supporting member according to a third exemplary embodiment of the present invention. Referring to FIG. 5, a supporting member 500 according to the present exemplary embodiment includes a body 510 and a rib 520 protruding from the body 510. The body 510 according to the present exemplary embodiment has a shape of a pipe surrounding a case of a rechargeable battery, and the rib 520 has a horizontal cross-section of an arc shape. Further, the length of the rib 520 is maximized to enlarge contact areas between a coolant and the rib 520 so as to improve cooling efficiency.

Figure 6:
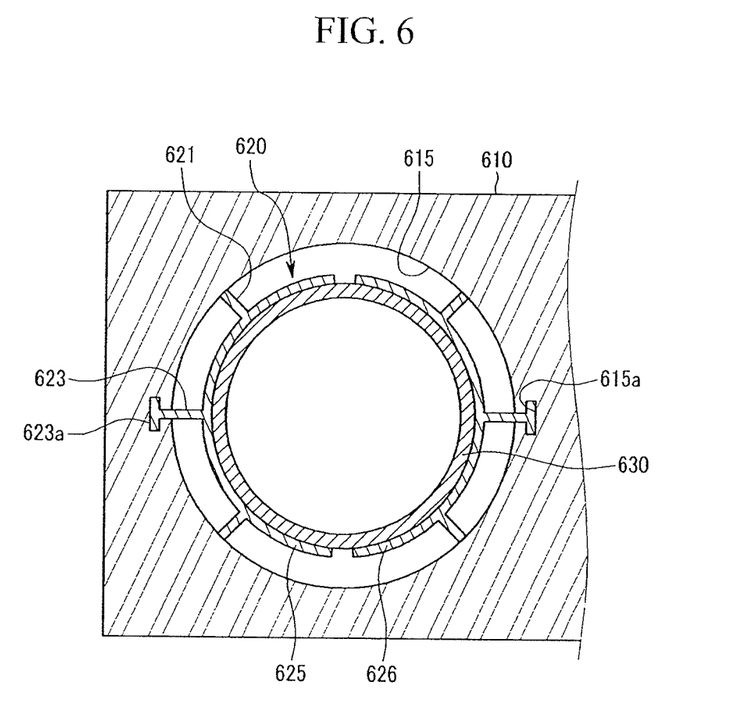
FIG. 6 is a cross-sectional view of a frame having a supporting member according to a fourth exemplary embodiment of the present invention.

FIG. 6 is a cross-sectional view of a frame having a supporting member according to a fourth exemplary embodiment of the present invention.

As shown in FIG. 6, a supporting member 620 includes a first supporting part 625 and a second supporting part 626. The first supporting part 625 and the second supporting part 626 are spaced apart from each other and are symmetrically arranged.

The supporting member 620 is inserted into a hole 615 formed in the frame 610. The first supporting part 625 and the second supporting part 626 have a horizontal cross-section of a semi-circular shape. Ribs 621 and 623 protrude from the outer surface of the first and second supporting parts 625 and 626. The ribs 621 and 623 include a supporting rib 621 and a fixing rib 623. The supporting rib 621 is in close contact with a hole 615 in the frame 610 and the fixing rib 623 protrudes further than the supporting rib 621 and is inserted into a fixing groove 615a in the hole 615.

A fixing protrusion 623a protrudes from a side on a distal end of the fixing rib 623. The fixing protrusion 623a is inserted into the fixing groove 615a in the hole 615. The fixing protrusion 623a helps place the supporting parts 625 and 626 at correct places and prevents them from rotating with regard to the case 630.

If, as in the present exemplary embodiment, the supporting member 620 includes a first supporting part 625 and a second supporting part 626 separated from each other, the supporting member 620 can be easily placed at the case 630 of rechargeable batteries of various sizes. In addition, even if the size of the case 630 is different, the first and second supporting parts 625 and 626, which are round-shaped, may elastically deform and come into close contact with the case 630, quickly transferring heat from the case 630 to the supporting member 620.

Figure 7:
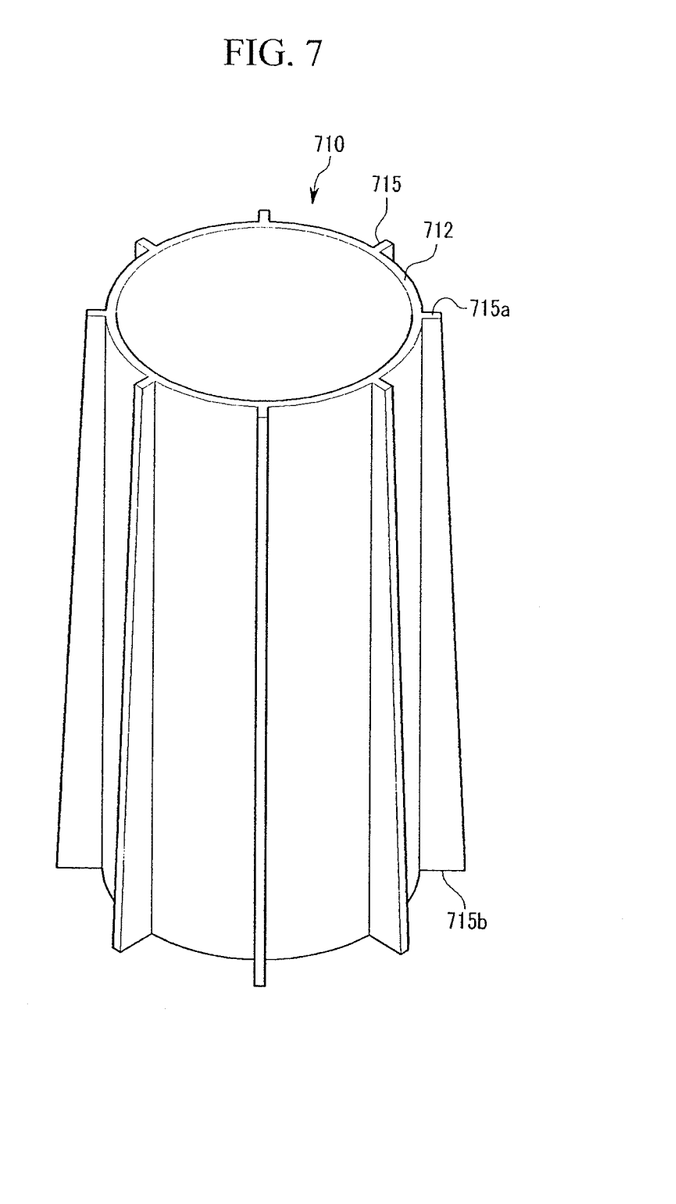
FIG. 7 is a perspective view of a supporting member according to a fifth exemplary embodiment of the present invention.
Figure 8:
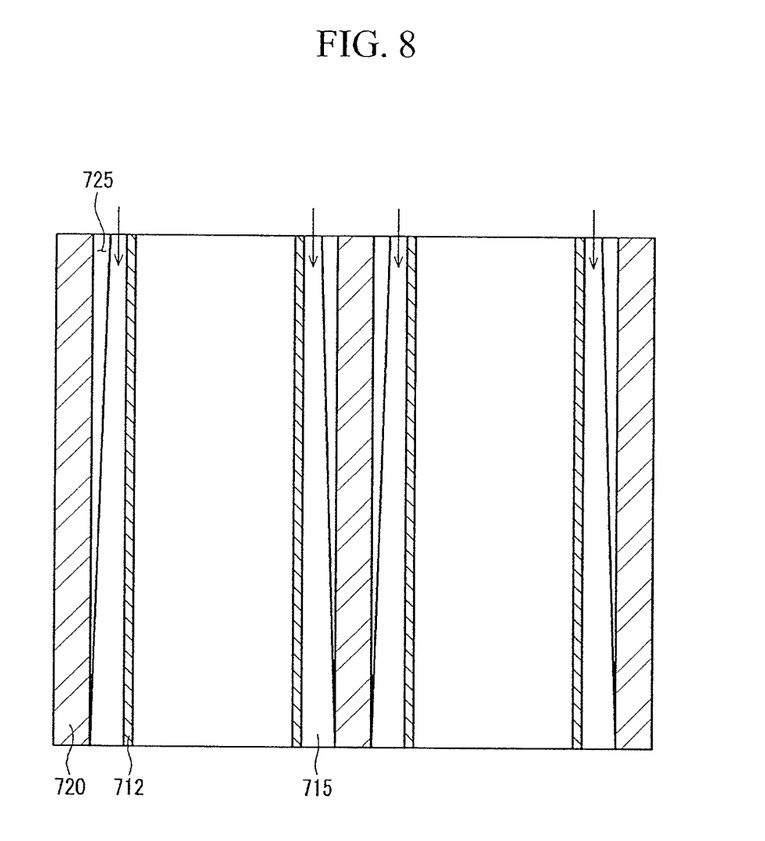
FIG. 8 is a cross-sectional view of a frame having the supporting member shown in FIG. 7.

FIG. 7 is a perspective view of a supporting member according to a fifth exemplary embodiment of the present invention, and FIG. 8 is a cross-sectional view of a frame having the supporting member shown in FIG. 7.

Referring to FIG. 7 and FIG. 8, a supporting member 710 according to the present exemplary embodiment includes a body 712 in close contact with a case of a rechargeable battery and a rib 715 outwardly protruding from the body 712.

The rib 715 according to the present exemplary embodiment has a height that increases in a direction along which a coolant flows. That is, the rib 715 includes a first end 715a in a position where the coolant flows in and a second end 715b in a position where the coolant flows out, and the second end 715b is higher than the first end 715a.

The supporting member 710 structured as described above is inserted into a hole 725 with a uniform horizontal cross-section, in a frame 720. If the first end 715a is formed small, when the coolant flows in, spaces between the ribs 715 communicate with each other in the hole 725. Consequently, the rechargeable battery can be uniformly cooled by preventing a large amount of air from flowing into spaces between certain ribs 715.

Figure 9:
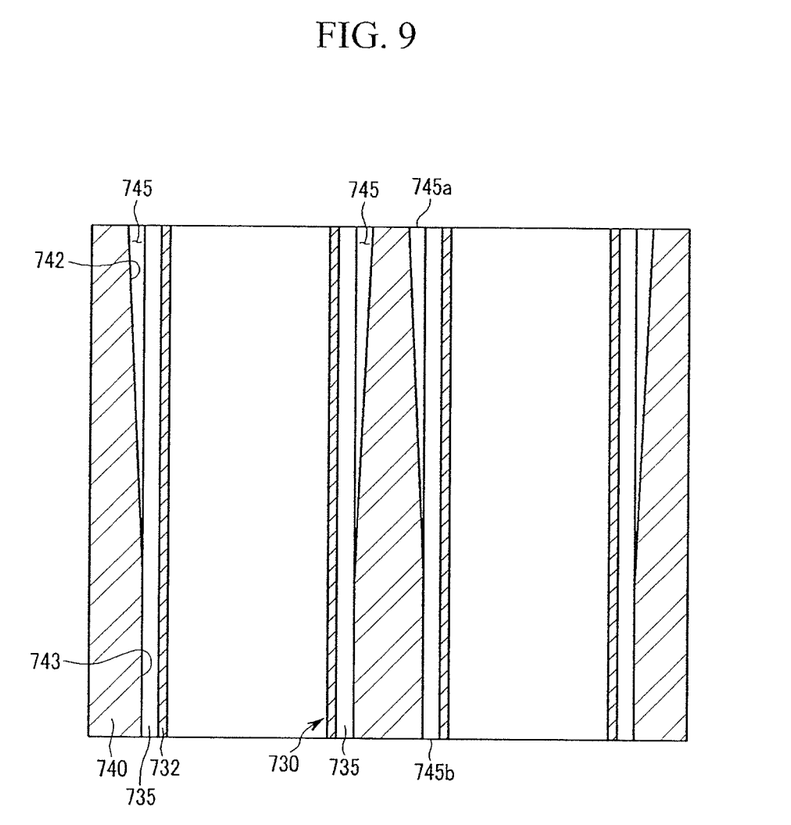
FIG. 9 is a vertical cross-section of a frame having a supporting member according to a sixth exemplary embodiment of the present invention.

FIG. 9 is a vertical cross-section of a frame having a supporting member according to a sixth exemplary embodiment of the present invention.

Referring to FIG. 9, a supporting member 730 includes a body 732 in close contact with a case of a rechargeable battery, and a rib 735 protruding from the body 732.

The rib 735 protrudes along the length of the body 732 and maintains a constant height. On the other hand, a hole 745 cut in a frame 740 has an inclined inner surface.

That is, the hole 745 has a coolant entrance 745a and a coolant exit 745b, and the coolant entrance 745a is larger than the coolant exit 745b. Further, the width of the coolant entrance 745a is larger than the height of the rib 735. As is described in more detail below, the inner surface of the hole 745 includes an inclined surface 742 inclined at a predetermined angle with the length of the rib 735, and a flat surface 743 extending from the inclined surface 742 and substantially parallel to the length of the rib 735. Further, the space between the rib 735 and the inclined surface 742 is larger at the entrance 745a than the exit 745b. The flat surface 743 contacts the rib 735 and stably fixes the supporting member 730 against shaking.

As described above, since the inner surface of the hole 745 is inclined, spaces between the ribs 735 at the entrance 745a communicate with each other. Therefore, a rechargeable battery can be uniformly cooled by preventing a large amount of air from flowing into the spaces between certain ribs 735.

Figure 10A:
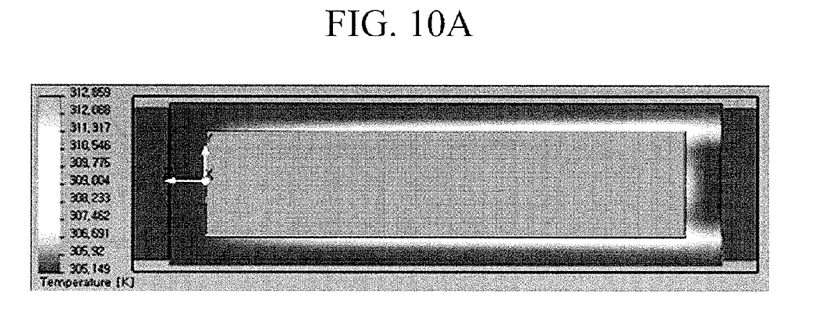
FIG. 10A to FIG. 10C are graphs showing a heat dissipation characteristic of a conventional battery module.
Figure 10B:
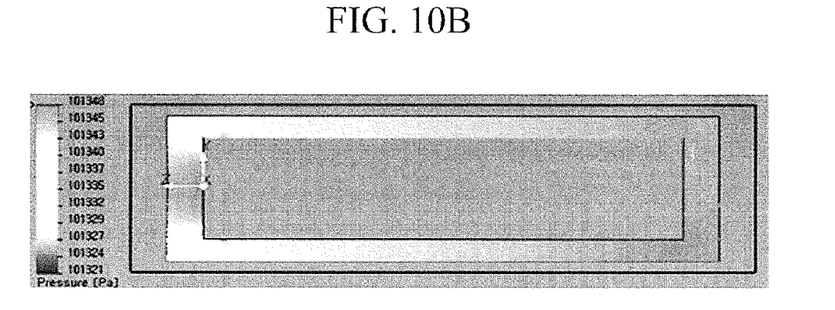
Figure 10C:
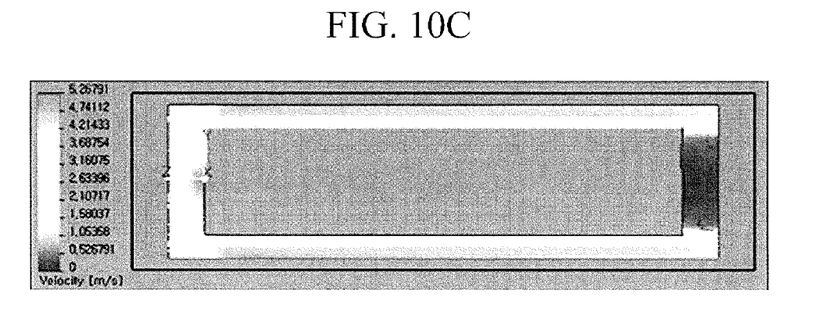
Figure 11A:
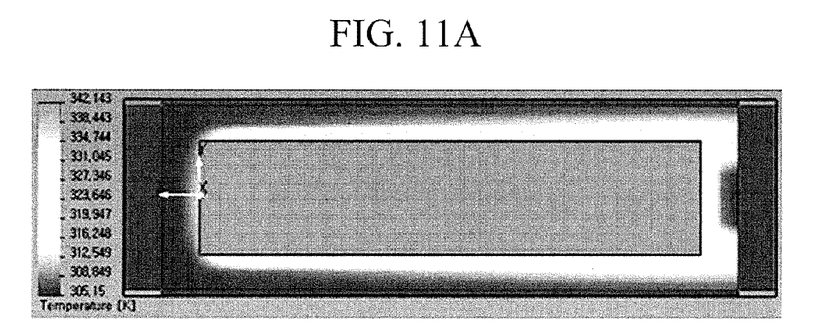
FIG. 11A to FIG. 11C are graphs showing a heat dissipation characteristic of a battery module according to the first exemplary embodiment of the present invention.
Figure 11B:
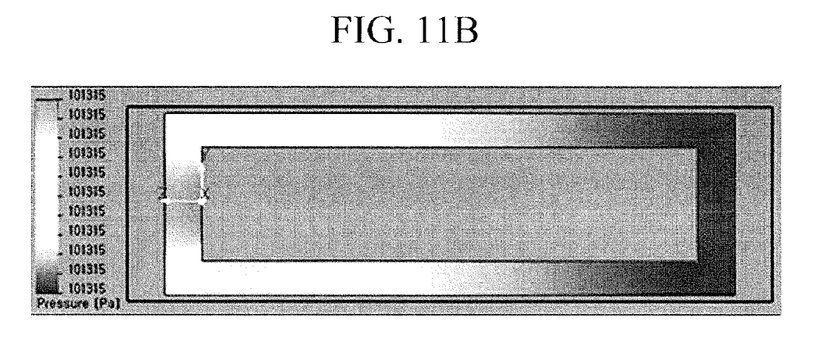
Figure 11C:
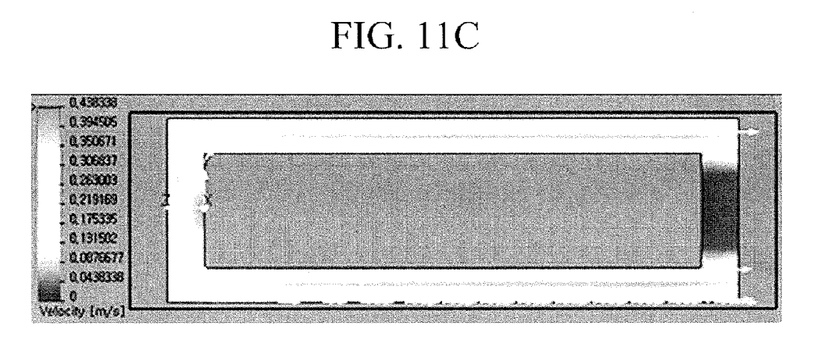

FIG. 10A to FIG. 10C are graphs showing a heat dissipation characteristic of a conventional battery module, and FIG. 11A to FIG. 11C are graphs showing a heat dissipation characteristic of a battery module according to the first exemplary embodiment of the present invention.

FIG. 10A to FIG. 10C show a temperature distribution, a pressure distribution, and a coolant velocity distribution, respectively, around a conventional cylindrical rechargeable battery when the rechargeable battery is inserted into a frame and cooled by exhausting internal heat generated during charge and discharge, through a space between the frame and the rechargeable battery.

FIG. 11A to FIG. 11C show a temperature distribution, a pressure distribution, and a coolant velocity distribution, respectively, around a rechargeable battery with a supporting member according to the first exemplary embodiment of the present invention, when the rechargeable battery is inserted into a frame and cooled by exhausting internal heat generated during charge and discharge, through a space between the frame and the supporting member.

FIG. 10A and FIG. 11A show a temperature distribution in each case. Comparing FIG. 10A and FIG. 11A, the temperature around the conventional battery module is represented by a color sky blue, meaning that the temperature is low due to poor heat dissipation. However, the temperature around the battery module according to the first exemplary embodiment is represented by colors yellow and green, meaning that the temperature is high due to brisk heat dissipation. That is, heat dissipation efficiency is improved due to more brisk heat transfer in the battery module according to the first exemplary embodiment.

FIG. 10B and FIG. 11B show a pressure distribution in each case. Comparing FIG. 10B and FIG. 11B, the conventional battery module shows a sharp drop in pressure near the entrance and is generally represented by a color sky blue. On the other hand, the battery module according to the first exemplary embodiment shows a gradual drop in pressure and has a large area represented by a color green. That is, the battery module according to the first exemplary embodiment shows a gradual distribution of pressure, meaning that the coolant easily flows in.

FIG. 10C and FIG. 11C show a coolant velocity distribution in each case. Comparing FIG. 10C and FIG. 11C, the conventional battery module has a relatively faster velocity away from the rechargeable battery and is represented by a color red. If a coolant's velocity is faster away from a rechargeable battery, the coolant and the rechargeable battery cannot contact well and cooling efficiency deteriorates.

However, the battery module according to the first exemplary embodiment has a relatively faster velocity in the central area where the rib is located and is represented by a color red. According to the above, the contact area between the rib and the coolant is sufficiently large and improves cooling efficiency.

As described above, with a supporting member according to the present invention, cooling efficiency has been considerably improved over the conventional battery module.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable battery comprising:
an electrode assembly repeating charge and discharge with the movement of ions;
a case having a length containing the electrode assembly;
a supporting member surrounding the case and having a plurality of ribs on the outer surface thereof wherein the height of each of the plurality of ribs changes along the length thereof wherein the supporting member surrounds the case and the ribs have a length substantially equal to the length of the case; and
a frame with an opening that is sized so as to receive the case, wherein the plurality of ribs are sized so that the plurality of ribs contact an inner wall of the frame and wherein the plurality of ribs include a supporting rib and a fixing rib that is higher than the supporting rib such that the fixing rib is inserted into a fixing groove in the inner wall of the frame.

2. The rechargeable battery of claim 1, wherein a heat-conductive adhesive layer is formed between the case and the supporting member.

3. The rechargeable battery of claim 1, wherein the supporting member includes a body in contact with the case and wherein each of the plurality of ribs extends along the length of the body.

4. The rechargeable battery of claim 3, wherein the body has a shape of a pipe.

5. The rechargeable battery of claim 3, wherein a slit extends along the length of the body.

6. The rechargeable battery of claim 1, wherein an anodized film is formed on the surface of the supporting member.

7. A battery module comprising:
a plurality of rechargeable batteries; and
a frame having openings with inner walls into which the rechargeable batteries are inserted,
wherein the rechargeable batteries include an electrode assembly and a case having a length and a supporting member in contact with the case for each electrode assembly, and
wherein the supporting member includes a body surrounding the case and a plurality of ribs protruding outwardly from the body and having a length substantially equal to the length of the case wherein a portion of the ribs are fixing ribs that engage with the inner walls of the frame so as to inhibit rotation of the supporting member in the opening and a portion of the ribs are supporting ribs that contact the inner walls of the frame but do not engage with the frame to inhibit rotation and wherein the supporting ribs and fixing ribs are alternately arranged about the body and wherein the height of each of the plurality of ribs changes along the length thereof wherein the fixing ribs are higher than the supporting ribs such that the fixing ribs are inserted into fixing grooves in the inner walls of the frame.

8. The battery module of claim 7, wherein the body has a shape of a pipe.

9. The battery module of claim 7, wherein a heat-conductive adhesive layer is formed between the case and the body.

10. The battery module of claim 7, wherein a fixing protrusion is formed at the fixing ribs.

11. The battery module of claim 10, wherein the fixing protrusion is inserted into the fixing grooves.

12. The battery module of claim 7, wherein a slit extends along the length of the body.

13. The battery module of claim 7, wherein an anodized film is formed on the surface of the supporting member.

14. The battery module of claim 7, wherein the height of the plurality of ribs increases from a coolant inflow end to a coolant outflow end.

15. A rechargeable battery assembly, the assembly comprising:
at least one rechargeable battery electrode assembly;
at least one case having a length that defines an interior space and an outer surface, wherein the at least one rechargeable battery electrode is positioned within the interior space of the at least one case;
at least one supporting member that is positioned around an outer surface of the case so as to be in thermal contact with the outer surface of the case, wherein the supporting member defines an opening that receives the at least one case so as to surround the case wherein the supporting member has an outer surface that extends around the outer surface of the case that is contoured to define a plurality of ribs so as to increase the surface area of the at least one supporting member to thereby facilitate heat dissipation from heat being generated by the battery and being thermally transmitted to the at least one supporting member wherein the at least one supporting member receives a single case and rechargeable battery electrode assembly;
a frame that defines at least one opening that receives the at least one supporting member so as to surround the at least one supporting member wherein the opening has contours that match contours of the outer surface of the supporting member and wherein the at least one opening in the frame is sized so that there is a space between the frame and the supporting member and wherein the at least one opening in the frame defines a coolant inflow end and a coolant outflow end and wherein the contours in the at least one opening and the plurality of ribs are sized so that the spacing between the contours in the at least one opening and the plurality of ribs change in the space between the frame and the supporting member from the coolant inflow end and the coolant outflow end and wherein the height each of the plurality of ribs changes along the length thereof and the length of the plurality of ribs is substantially equal to the length of the case and wherein each of the plurality of ribs contacts inner walls of the at least one opening in the frame wherein at least one of the ribs is a fixing rib and the other ribs are supporting ribs and wherein the fixing rib is higher than the supporting ribs such that the fixing rib is inserted into a fixing groove in the inner walls of the at least one opening in the frame.

16. The assembly of claim 15, wherein the plurality of ribs are formed on the outer surface of the supporting member.

17. The assembly of claim 16, wherein fixing rib engages with the frame so as to inhibit rotation of the supporting member within the at least one opening in the frame.

18. The assembly of claim 16, wherein the at least one opening in the frame includes contours that receive the ribs.

* * * * *